(12) United States Patent
Lee

(10) Patent No.: US 7,623,640 B2
(45) Date of Patent: Nov. 24, 2009

(54) DOOR INTERCOM SYSTEM

(75) Inventor: Tsung Chiang Lee, Jhongli (TW)

(73) Assignee: HOA Telecom Co., Ltd., Taoyuan (TW)

( * ) Notice: Subject to any disclaimer, the term of this patent is extended or adjusted under 35 U.S.C. 154(b) by 867 days.

(21) Appl. No.: 11/227,746

(22) Filed: Sep. 15, 2005

(65) Prior Publication Data

US 2007/0064897 A1  Mar. 22, 2007

(51) Int. Cl.
*H04M 1/60* (2006.01)
*H04M 9/00* (2006.01)

(52) U.S. Cl. .............. 379/167.02; 379/102.01; 379/102.06; 379/159; 379/160; 379/167.06; 379/167.11; 379/167.12

(58) Field of Classification Search .......... 379/90.01, 379/93.02, 93.05, 93.14, 93.17, 93.23, 100.12, 379/102.01, 102.02, 102.06, 102.07, 159, 379/160, 163, 164, 167.01, 167.02, 167.04, 379/167.06, 167.11, 167.12, 167.13, 167.14
See application file for complete search history.

(56) References Cited

U.S. PATENT DOCUMENTS

| | | | | | |
|---|---|---|---|---|---|
| 3,917,911 | A | * | 11/1975 | Lesher | 379/102.06 |
| 4,937,855 | A | * | 6/1990 | McNab et al. | 379/102.06 |
| 5,046,083 | A | * | 9/1991 | Trell | 379/102.06 |
| 5,475,741 | A | * | 12/1995 | Davis et al. | 379/102.06 |
| 5,598,456 | A | * | 1/1997 | Feinberg | 379/42 |
| 7,263,182 | B2 | * | 8/2007 | Allen et al. | 379/215.01 |

* cited by examiner

*Primary Examiner*—Binh K Tieu
(74) *Attorney, Agent, or Firm*—C. G. Mersereau; Nikolai & Mersereau, P.A.

(57) ABSTRACT

Disclosed is a door intercom system, which is installed on a door of a community for communicating with and identifying a visitor and opening/closing the door through a network by an inhabitant among a plurality of inhabitants of the community and capable of transferring data to a system provider through the network. The door intercom system has a central processing unit (CPU) connected to a database, a dialing key module, a display module, a video and audio processing module and a network interface, respectively. In the database, inhabitant codes, network logon numbers and identification numbers of the plurality of inhabitants are stored. When the visitor inputs an inhabitant code through the dialing key module, the CPU acquires the network logon number corresponding to the inhabitant and is communicatively connected to the network through the network interface, the network being connected at the other end to the inhabitant end or the system provider through a public switched telephone network (PSTN). As such, the visitor is allowed to communicate with the inhabitant by an email or message through the display module. Alternatively, the visitor may directly communicate with the inhabitant by a IP phone or be directly identified by a VP phone.

9 Claims, 5 Drawing Sheets

DOOR INTERCOM SYSTEM

FIELD OF THE INVENTION

The present invention relates to a door intercom system. More particularly, the present invention relates to a door intercom system operated through a network and a method for operating the system.

BACKGROUND OF THE INVENTION

Today urbanization has presented largely and thus communities and multi-storey buildings have become a good choice for living environment. However, men into and out of the communities and multi-storey buildings are numerous and hard to be monitored and controlled, and thus a security issue is arisen. Generally, guardian rooms are established and intercoms are provided so that men into and out of the communities and multi-storey building may be identified. For further guaranteed security, identification devices may be installed at doors and elevators of the communities and multi-storey building to avoid any non-inhabitant from invading.

However, this scheme may have shortcomings. When the habitant is not home or cannot answer the intercom, a visitor or others may not be identified in front of a guardian at the guardian room. To solve this problem, the habitant is requested to leave an emergency telephone number at the guardian room so that the visitor may be identified through telephone. However, privacy exposure may become another issue for the inhabitants.

To overcome this problem, a prior art "DOOR INTERCOM SYSTEM" also disclosed by the Inventor of the present invention is provided. In the door intercom system, a database is built in the door intercom system to store telephone number/cellular phone numbers of all the inhabitants in the same community. With the inhabitant's telephone number/cellular phone numbers in the database, the visitor may communicate with the inhabitant he/she intends to visit through a public switched telephone network (PSTN). Further, the inhabitant may remotely open or close his/her door through telephone. Although provision of the PSTN may solve the problem of inconvenience when the door intercom system is used, such communication manner through the PSTN is higher in cost. Further, the communication may not be visually obtained with an economic budget allowed by using the PSTN. As a result, the inhabitant may not identify if the visitor is exactly the one as communicated on telephone. In this manner, security may not be completely guaranteed for such door intercom system.

In view of these problems encountered in the prior art, the Inventor has paid many efforts in the related research and finally developed successfully a door intercom system in which a network and PSTN are utilized alternatively so as to promote convenience and security of such system.

SUMMARY OF THE INVENTION

According to the present invention, a door intercom system is disclosed, characterized in that a database is built therein and network logon numbers of all inhabitants in a community are stored in the database so that a visitor may be communicatively connected to an inhabitant he intends to visit among all the inhabitants of a community through an email or message. Alternatively, the visitor may communicate with the inhabitant through an IP phone or may be identified by the inhabitant through a VP phone. Further, the inhabitant may dial to the door intercom system to direct a door of the community to be opened through the network.

The door intercom system is further characterized in that the database is also provided to store general telephone numbers or cellular phone numbers of all the inhabitants so that the visitor may be communicatively connected the inhabitant he intends to visit by connecting himself to computer telephony integration (CTI) through a PSTN. At the same time, the inhabitant is allowed to open or close the community door by telephone dialing.

The above and other features and purposes of the present invention will be more apparent to those skilled in the art after the description below is read with reference to the appended drawings.

DETAILED DESCRIPTION OF THE PREFERRED EMBODIMENT

Figure 1:
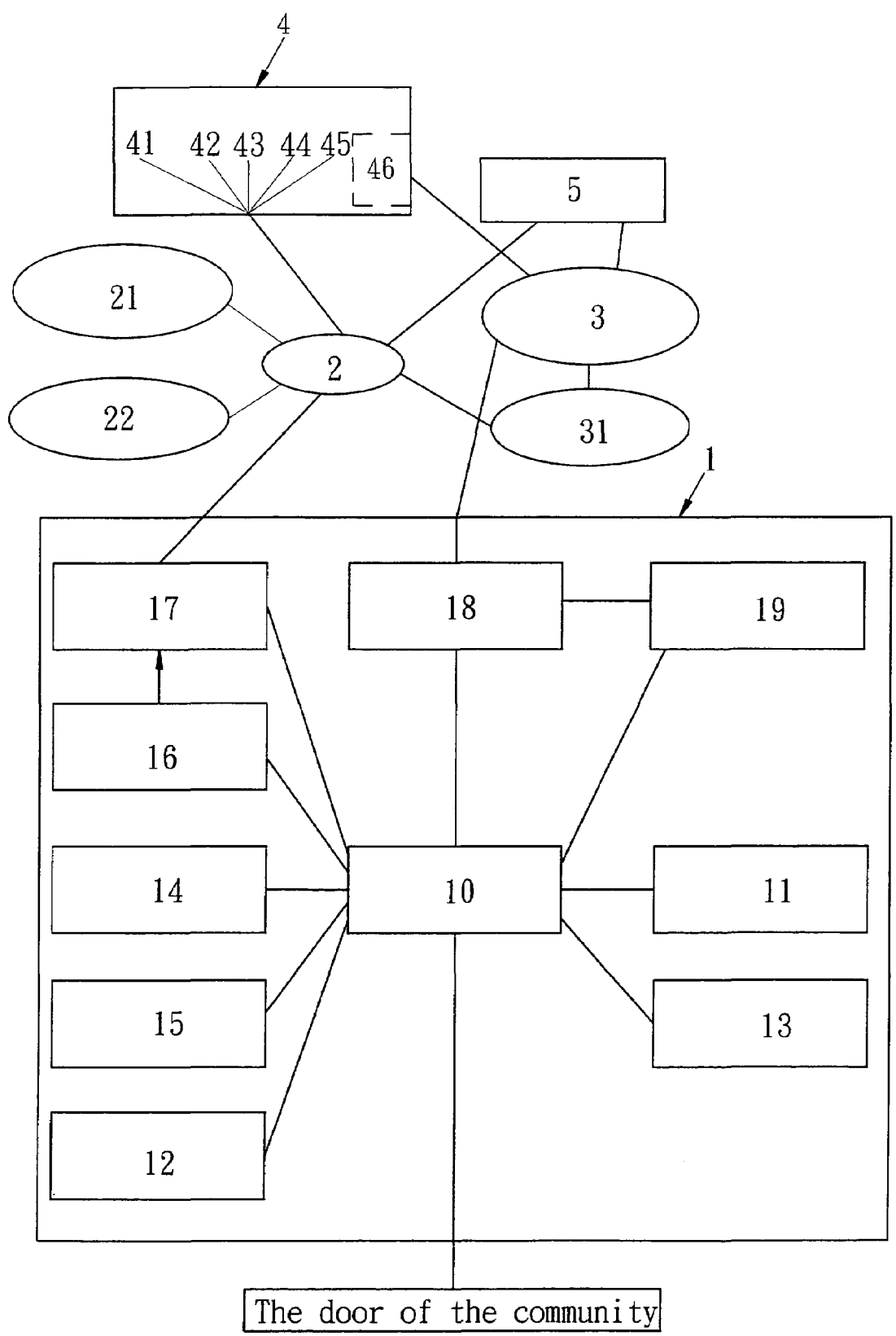
FIG. 1 is a schematic diagram of a door intercom system according to the present invention.
Figure 2:
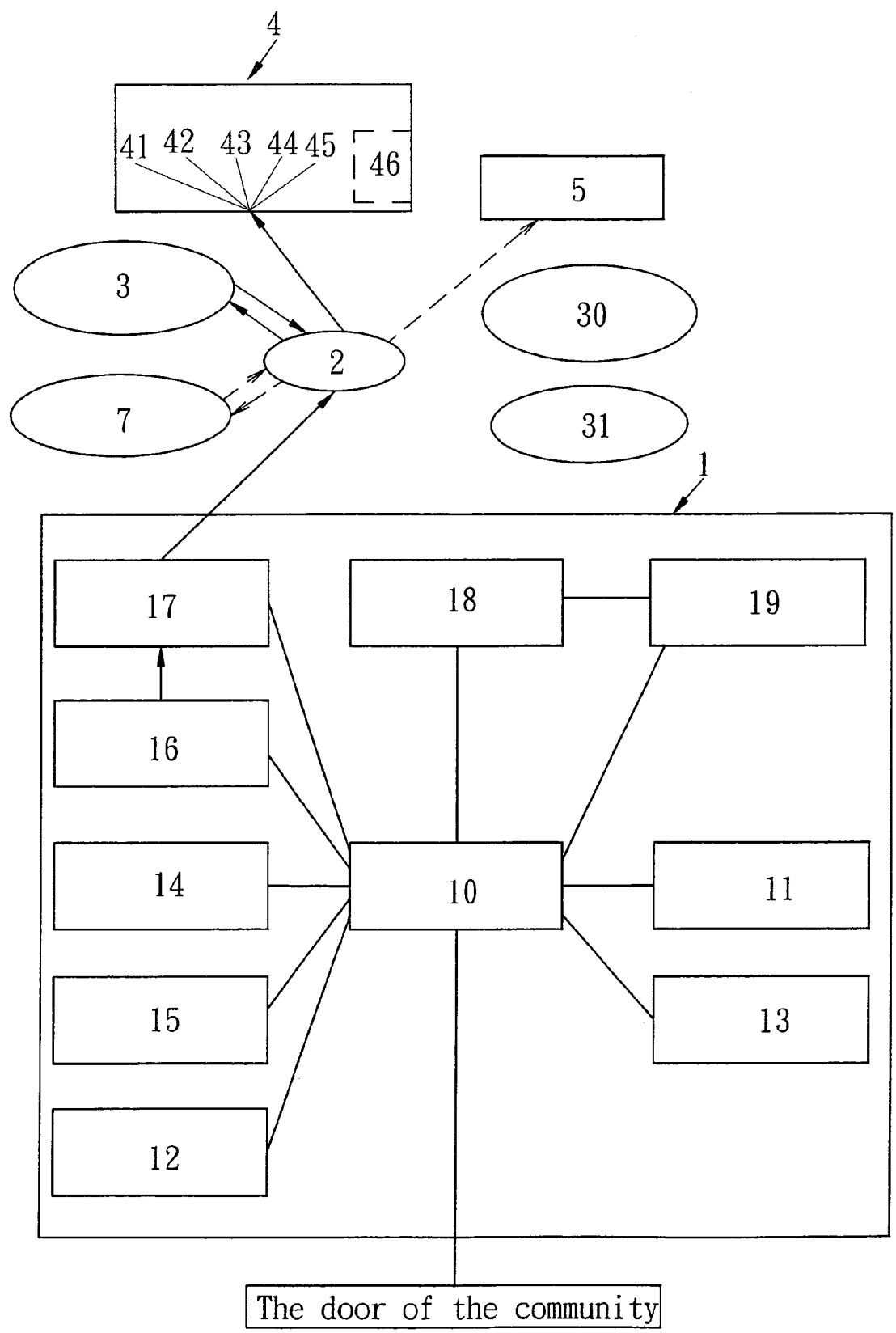
FIG. 2 is a schematic diagram illustrating a relationship between an inhabitant end and a system provider communicatively connected to each other through a network according to the present invention.

Referring to FIG. 1 and FIG. 2, a door intercom system 1 according to the present invention is depicted therein. As shown, the door intercom system 1 is mainly installed on a door of a community or a multi-storey building so that an inhabitant end 4 may come into communication with a visitor through a network (particularly the Internet) 2 or PSTN 3 so as to identify the visitor. After the visitor is identified, the inhabitant may control the door to open or close through a IP phone 41, VP phone 42, personal digital assistant (PDA) 44, cellular phone 45 or general telephone 46. Further, the door intercom system 1 and a system provider 5 may have data transferred there between through the network 2 or PSTN 3.

In an embodiment, the door intercom system 1 comprises a central processing unit 10, a database 11, a dialing key module 12, a display module 13, a radio frequency identification (RFID) sensor device 14, a remote control 15, a video and audio processing module 16, a network interface 17, a dial and communication module 18 and an incoming telephone number acquiring module 19. The database 11 is connected to the CPU 10 to store inhabitant codes, network logon numbers, telephone numbers and ID codes of all the inhabitants in the same community.

The dialing key module 12 is connected to the CPU 10 so that the visitor may come into communication with the inhabitant end 4 by inputting a predetermined inhabitant code. Specifically, the CPU 10 may acquire the network logon number of the inhabitant from the database 11 after the visitor 12 inputs the inhabitant code of the same inhabitant through the dialing key module 12.

The display module 13 is typically a liquid crystal display (LCD) screen and connected to the CPU 10. With the display module 13, the visitor may be presented with an email, message, operating information or textual description.

The RFID sensor device 14 is connected to the CPU 10 and may identify data codes in an identification card hold by the visitor when the identification card is draw near the door intercom system 1. Then, the identification codes in the identification card are compared with identification codes stored in the database 11 by the CPU 10. If the identification code matches one of the identification codes in the database 11 according to the comparison result, the CPU 10 issues a drive signal to open the door of the community.

The remote control 15 is communicatively connected to the CPU 10. The CPU 10 compares the identification code of the inhabitant from the remote control 15 with the identification codes of all of the inhabitants stored in the database 11 and opens the door when the comparison result shows a match found in the database 11.

The video and audio processing module 16 is a module composed of an IP phone and a VP phone and connected to the CPU 10.

The network interface 17 is connected to the CPU 10 and the video and audio processing module 16 and further connected to a network 2 in a cabled or wireless manner. As such, the CPU 10 or video and audio processing module 16 may be communicatively connected to the inhabitant end 4 or system provider 5 through the network 2.

The dial and communication module 18 is connected to the CPU 10.

The incoming telephone number acquiring module 19 is connected to the CPU 10 and the dial and communication module 18 and used to further enhance the identification function with respect to the visitor. When a call is made from a visitor through the PSTN 8 to the door intercom system 1, the incoming telephone number acquiring module 19 acquires the telephone number of the visitor end. Then, the telephone number is compared with the network logon numbers or telephone numbers stored in the database 11 by the CPU 10. When the telephone number of the incoming call is one of the network logon numbers or telephone numbers stored in the database 11, a drive signal is issued by the CPU 10 to open the door of the community. In other words, when the inhabitant goes back home but without his identification card or remote control carried in hand, he/she may dial to the door intercom system 1 through his/her cellular phone or the Internet. Then, the CPU 10 compares the telephone number of the incoming call with the telephone number of the inhabitant pr-stored in the database 11. If the telephone number of the incoming call matches the telephone number of the inhabitant, the door is driven open so that the inhabitant may get into the door when his/her identification card or remote control is not available.

In an embodiment, the network 2 is connected to a network exchange 21 (GK) and a dynamic DNS server 22.

When the inhabitant inputs an inhabitant code through the dialing key module 12, the CPU 10 acquires the network logon number from the database 11 and enables the inhabitant end 4 to be communicatively connected to the visitor through the network exchange 21 (GK). As such, the visitor may come into communication with the inhabitant end 4 through an email or message. Alternatively, they may communicate directly with each other through the video and audio processing module 16 and the visitor may be identified through a video form.

Therefore, the network 2 may be provided for the inhabitant end 4 to open or close the door of the community and connected to the system provider 5 so that a data transfer may be conducted there between.

The dynamic DNS server 22 is used with a computer having a variable IP (e.g. a computer using ADSL of PPPOE protocol, a computer using a cable modem of DHCP protocol and a computer using dial-up). If the computer has a fixed IP, it may be used directly with the network exchange 21 without the need of the DNS server 21.

Figure 3:
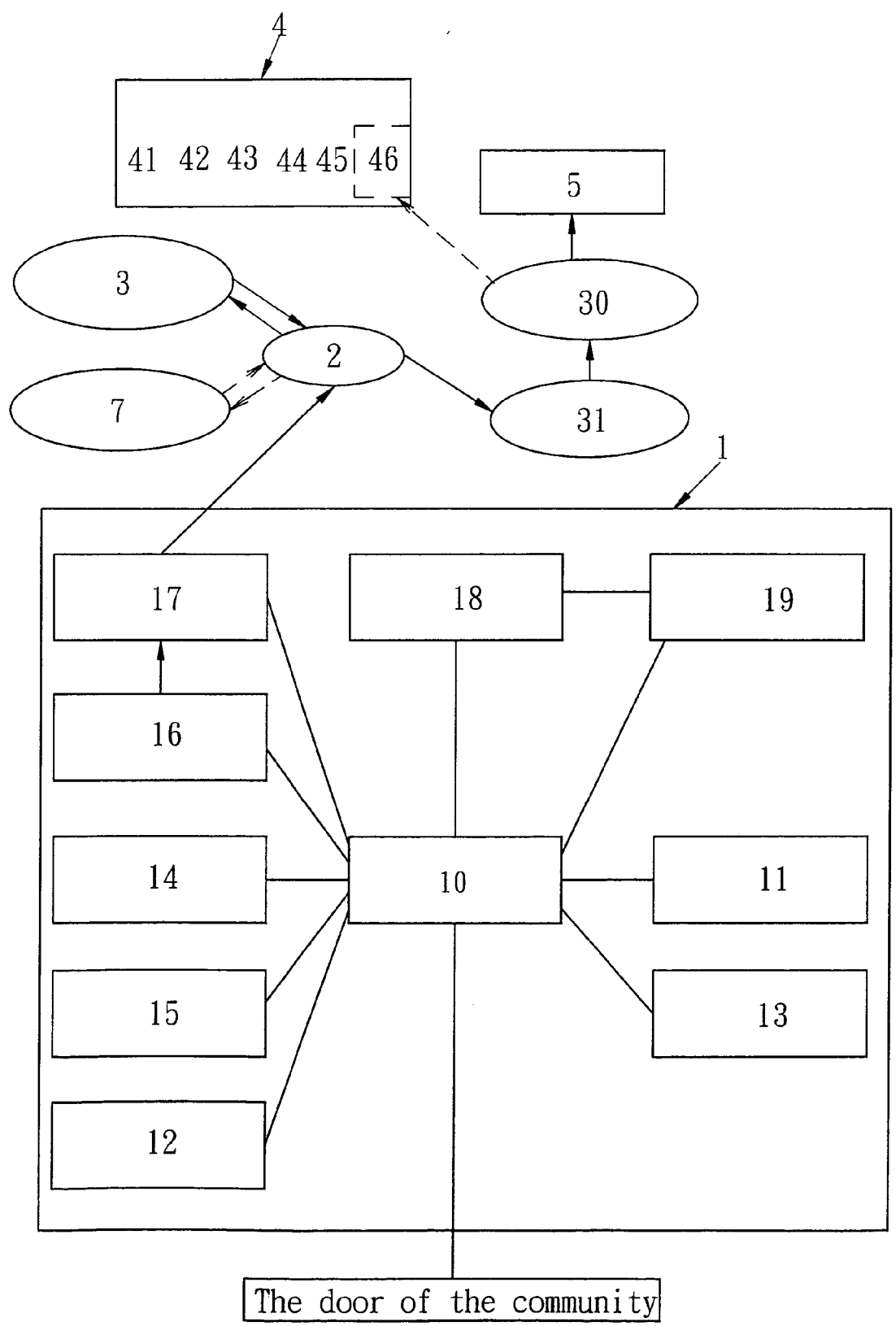
FIG. 3 is a schematic diagram illustrating the door intercom system is communicatively connected to a general telephone of the inhabitant end and the system provider through the network according to the present invention.
Figure 4:
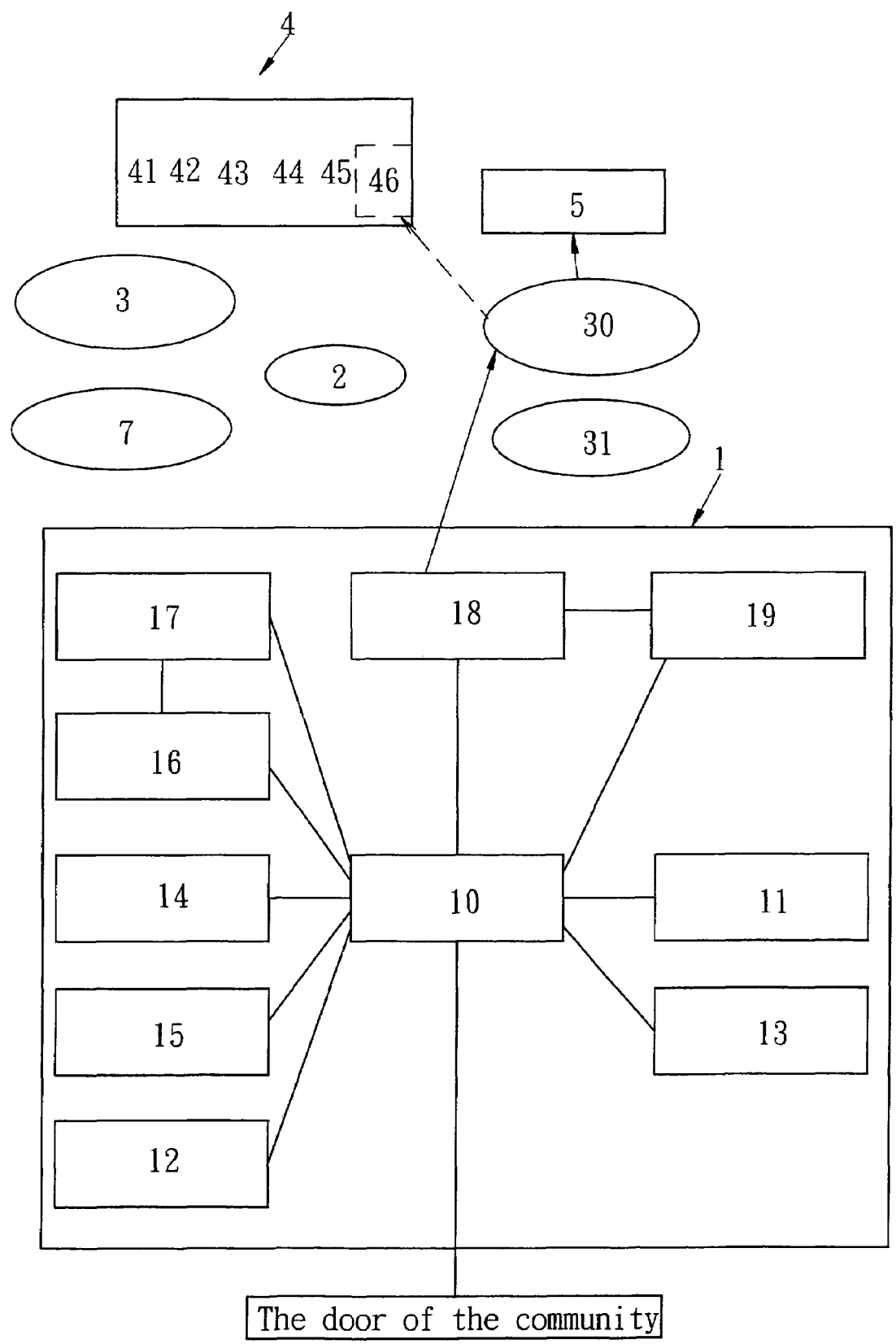
FIG. 4 is a schematic diagram illustrating the door intercom system is communicatively connected to a general telephone of the inhabitant end and the system provider through a PSTN according to the present invention.

In an embodiment, the PSTN 3 is connected to computer telephony integration (CTI) 31, the dial and communication module 18, a general telephone 46 at the inhabitant end 4 and a system provider 5. The CTI 31 has an input end connected to the network 2 and an output end connected to the PSTN 3 as shown in FIG. 3. When the visitor inputs an inhabitant code through the dialing key module 12, the CPU 10 acquires the network logon number of the same inhabitant from the database 11 and comes into communication with the inhabitant end 4 through the network exchange 21. If the inhabitant end 4 may not be communicated within a specific period, the CTI 31 may be directed to connect to the PSTN 3 so that the visitor may come into communication with the general telephone of the inhabitant end 4 in another interactive mode. At this time, the PSTN 3 is also communicatively connected to the service provider 5 so that the PSTN 3 may transfer data to the service provider 5 (refer to FIG. 4). In addition, when the visitor inputs the telephone number of the general telephone 46 of the inhabitant through the dialing key module 12, the CPU 10 may be communicatively connected to the PSTN 3 through the dialing key module 18 so that the visitor may come into communication with the general telephone of the inhabitant end 4. At this time, the PSTN 3 is also communicatively connected to the system provider 5 so that the PSTN 3 may transfer data to the system provider 5.

Figure 5:
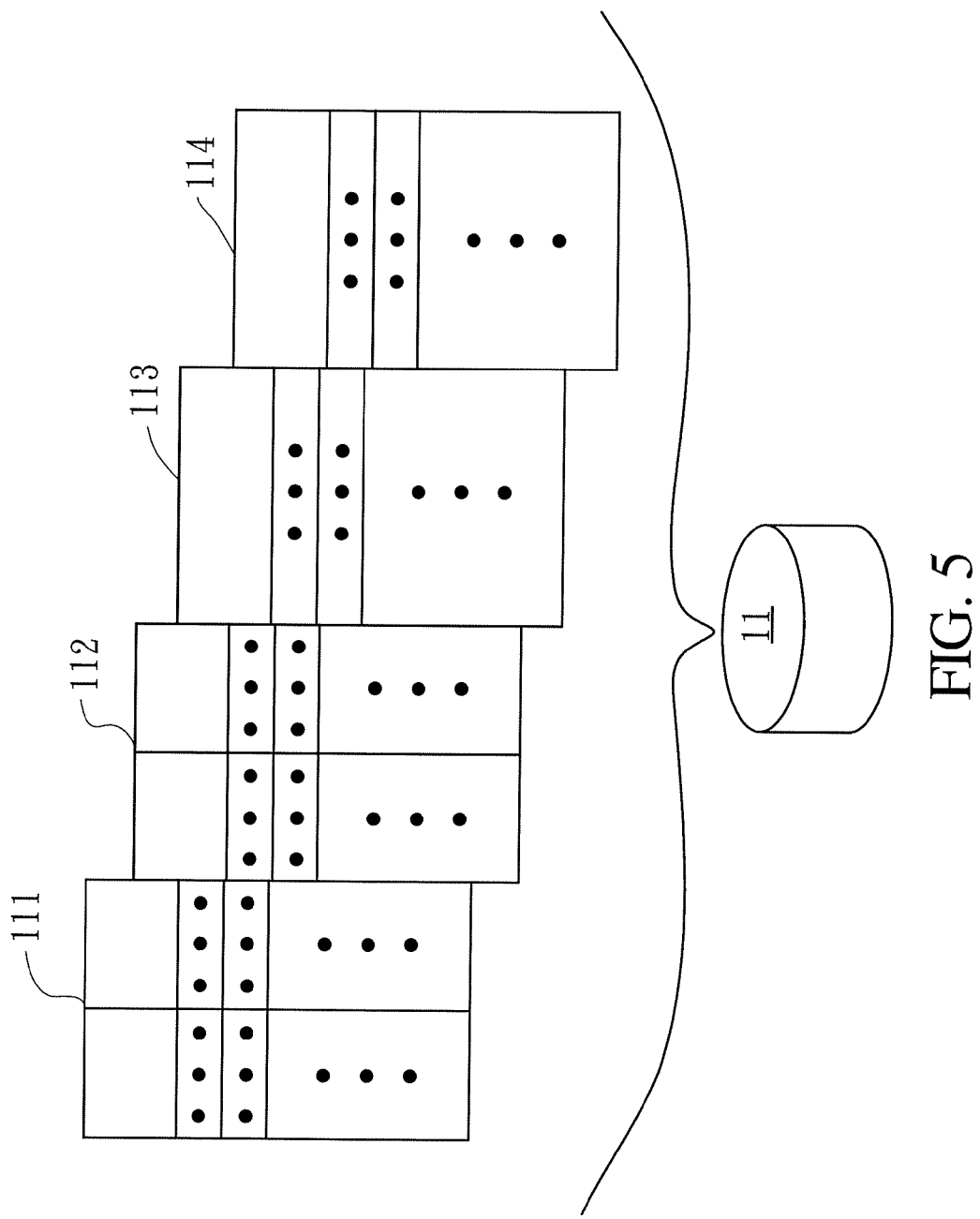
FIG. 5 is a diagram illustrating a data arrangement scheme of data stored in the database according to the present invention.

Referring next to FIG. 5, a schematic diagram illustrating a data arrangement scheme for the data stored in the database according to the present invention is depicted therein. The data stored in the database 11 comprises four data categories. A first data category 111 is a relationship table of the inhabitant codes and the preset network logon numbers of all the inhabitants. Each of the preset network logon numbers is typically the telephone number of an IP phone number 41, an image telephone 42, a computer 43, a personal digital assistant (PDA) 44 or a cellular phone 45 of an inhabitant end 4 having been registered on the network. As such, the visitor may come into communication with the inhabitant end through the IP phone number 41, the VP telephone 42, the computer 43, the personal digital assistant (PDA) 44 or the cellular phone 45 at the inhabitant end 4 via the network 2. Then, the visitor may communicate with or be identified by the inhabitant end through an email, message and audio and video form. A second data category 112 is a relationship table of the inhabitant codes and the telephone numbers of all the inhabitants. When the door intercom system 1 cannot communicate with the inhabitant end 4 through the network 2, the CPU 10 may automatically dial to the telephone of the inhabitant through the PSTN 3 according to data in the second data category 112 so as to communicate with the inhabitant.

A third and fourth data category 113,114 are RFID codes and remote control identification codes, respectively, which may be used for comparison of data codes of identification cards or remote controls of the inhabitants. If the comparison result shows the data code of the identification card or remote control of the inhabitant can be found in the third and fourth data categories 113,114, the CPU 10 directs the door to be opened.

To enable the specific efficacy of the inventive door intercom system to be more apparent, it will be described in terms of its operating process. When the visitor is not sure about the inhabitant code of an inhabitant he is intended to visit, the visitor may query the inhabitant code from the guard through a help button installed on the door intercom system. Then, the visitor inputs the inhabitant code which he has acquired from the guard through the dialing key module. At this time, the CPU 10 extracts the network logon number of the inhabitant from the database 11 and communicatively connects the inhabitant end 4. Then, the inhabitant end 4 opens the door for the visitor. If the inhabitant end 4 cannot be communicatively connected, the CPU 10 automatically dials to the general telephone of the inhabitant so that the visitor may connect communicatively the inhabitant.

To facilitate the system provider 5 to effectively manage the door intercom system 1, the system provider 5 is allowed to update content in the database 11 through the network 2 or PSTN 3. As such, the system provider 5 may load newest inhabitant data, network logon number, telephone number, inhabitant's identification code into the door intercom system 1 when an old inhabitant emigrates, a new inhabitant immigrates or system operating data associated with the door intercom system are to be updated. Namely, the system provider 5 may load the newest data into the door intercom system 1 to update the original data therein through the network or PSTN 3 when necessary so as to maintain the system 1 at its optimal performance. Moreover, the community having the door intercom system 1 installed may be further assured with better security.

With the inventive door intercom system used, at least the following efficacies may be achieved. 1. Since the network may be conveniently accessed, the visitor may be communicatively connected to the inhabitant end through a diversity of communication forms such as an email, message and audio and video forms. Further, the interactive forms of the IP and VP phones may be provided to largely enhance convenience and security of visitor identification with a relatively low cost required. 2. The inhabitant may dial to the door intercom system by accessing the network to direct the door to be opened. As such, it is possible to open the door for the inhabitant at a remote end. 3. Since the network logon number and cellular phone number of the inhabitant is stored in the database, it is possible for the visitor to connect communicatively the inhabitant by using the cellular phone or economically accessing the network. As such, a sound intercom scheme is provided.

In conclusion, the heart of this invention is the alternative use of the PSTN and network so that deficiency of the current door intercom system may be effectively improved.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A door intercom system installed on a door of a community for communicating with and identifying a visitor and opening/closing the door through a network by an inhabitant among a plurality of inhabitants of the community and capable of transferring data to a system provider through the network, comprising:
 a central processing unit (CPU);
 a database used to store inhabitant codes, network logon numbers and identification numbers of the plurality of inhabitants therein;
 a dialing key module connected to the CPU and through which the visitor inputs the inhabitant code corresponding to the inhabitant, wherein the CPU acquires the network logon number corresponding to the inhabitant from the database in response to the inhabitant code received;
 a display module connected to the CPU to display information associated with the inhabitant to the visitor;
 a video and audio processing module connected to the CPU and being composed of an IP phone and a VP phone; and
 a network interface connected to the CPU and video and audio processing module, respectively, at one end and to the network at the other end so that the door intercom system is allowed to be communicatively connected to the inhabitant end and transfer data to the system provider,
 wherein the network is connected to a PSTN and connected to the inhabitant end through the PSTN so that the visitor is allowed to communicate with the inhabitant end through an email or message or alternatively through the video and audio processing module or be identified by the inhabitant end through the video and audio processing module, the network being also connected to the system provider so that the door intercom system is allowed to transfer data to the system provider.

2. The door intercom system according to claim 1, wherein the PSTN is also provided so that the inhabitant end is allowed to control the door to be opened or closed and the data is allowed to be transferred between the door intercom system and system provider therethrough, the database has telephone numbers corresponding to the plurality of inhabitants therein and the visitor inputs a telephone number corresponding to the inhabitant through the dialing key module, and the CPU is allowed to be communicatively connected to the PSTN through a dial and communication module so that the CPU is allowed to be connected to the PSTN through the dial and communication module and the visitor is allowed to communicate with the inhabitant end through the general telephone at the inhabitant end.

3. The door intercom system according to claim 2, wherein an incoming phone number acquiring module is further provided between the CPU and dial and communication module to acquire an incoming phone number with respect to an incoming call made from another user end through the PSTN to the door intercom system and the CPU compares the incoming phone number with the network logon numbers or telephone numbers preset in the database and directs the door to be opened by issuing a drive signal.

4. The door intercom system according to claim 2, wherein the PSTN is further connected to the network through computer telephony integration (CTI) so that the network is allowed to be connected to the general telephone of the inhabitant end through the CTI and PSTN.

5. The door intercom system according to claim 1, wherein the CPU is connected to a dynamic DNS server through a network loop so that a computer having a variable IP is allowed to be used.

6. The door intercom system according to claim 1, wherein the network is provided so that the inhabitant end is allowed to open or close the door by telephone dialing.

7. The door intercom system according to claim 1, wherein the CPU of the door intercom system is further connected to a radio frequency identification (RFID) sensor device so that an identification information sensed by the RFID sensor device is allowed to be transferred to the CPU and compared with the inhabitant's identification codes stored in the database and the CPU is allowed to direct the door to be opened when the comparison result shows there is a match found in the database.

8. The door intercom system according to claim 7, wherein the CPU of the door intercom system is further connected to a remote control device and the sensed identification information is allowed to be transferred to the CPU and compared with the inhabitant's identification codes stored in the database and the CPU is allowed to direct the door to be opened when the comparison result shows there is a match found in the database.

9. The door intercom system according to claim 8, wherein the database has a first, second, third and fourth data category, the first data category being a relationship table of the inhabitant codes and network logon numbers, the second category being a relationship table of the inhabitant codes and the telephone numbers, the third data category and fourth data category are RFID codes and remote control's identification codes, respectively, wherein the CPU is automatically communicatively connected to the inhabitant end through the PSTN according to the second data category, and wherein data code of the identification card or the remote control of the inhabitant is compared with the RFID codes and remote control' identification codes and the CPU directs the door to be opened by issuing a drive signal when the comparison result shows a match found in the third and fourth data categories.

* * * * *